Nov. 27, 1962     F. M. PIERSON     3,065,803
CYLINDER MOUNTING FOR TAIL WHEEL OF PLOWS
Filed Oct. 21, 1960     2 Sheets-Sheet 1
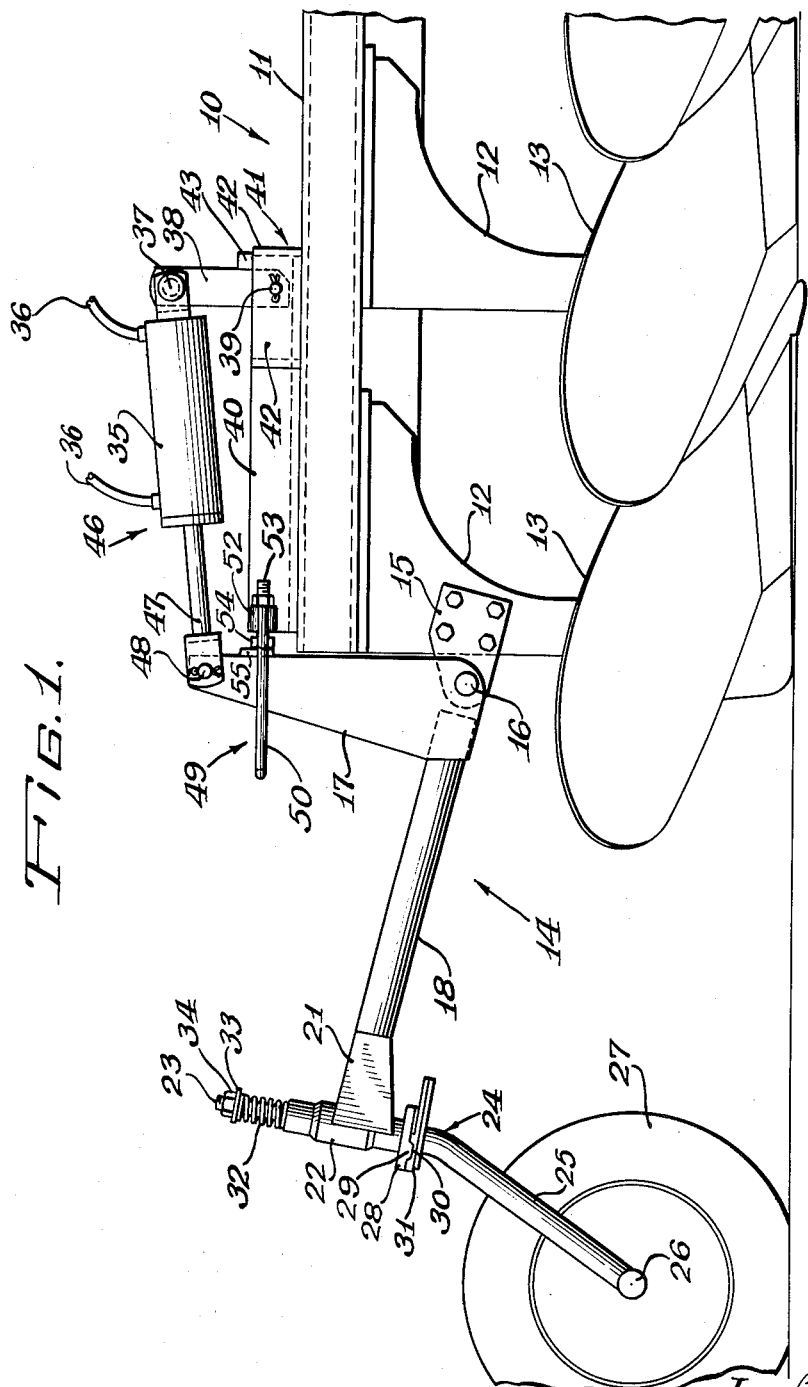
Inventor:
Frederick M. Pierson

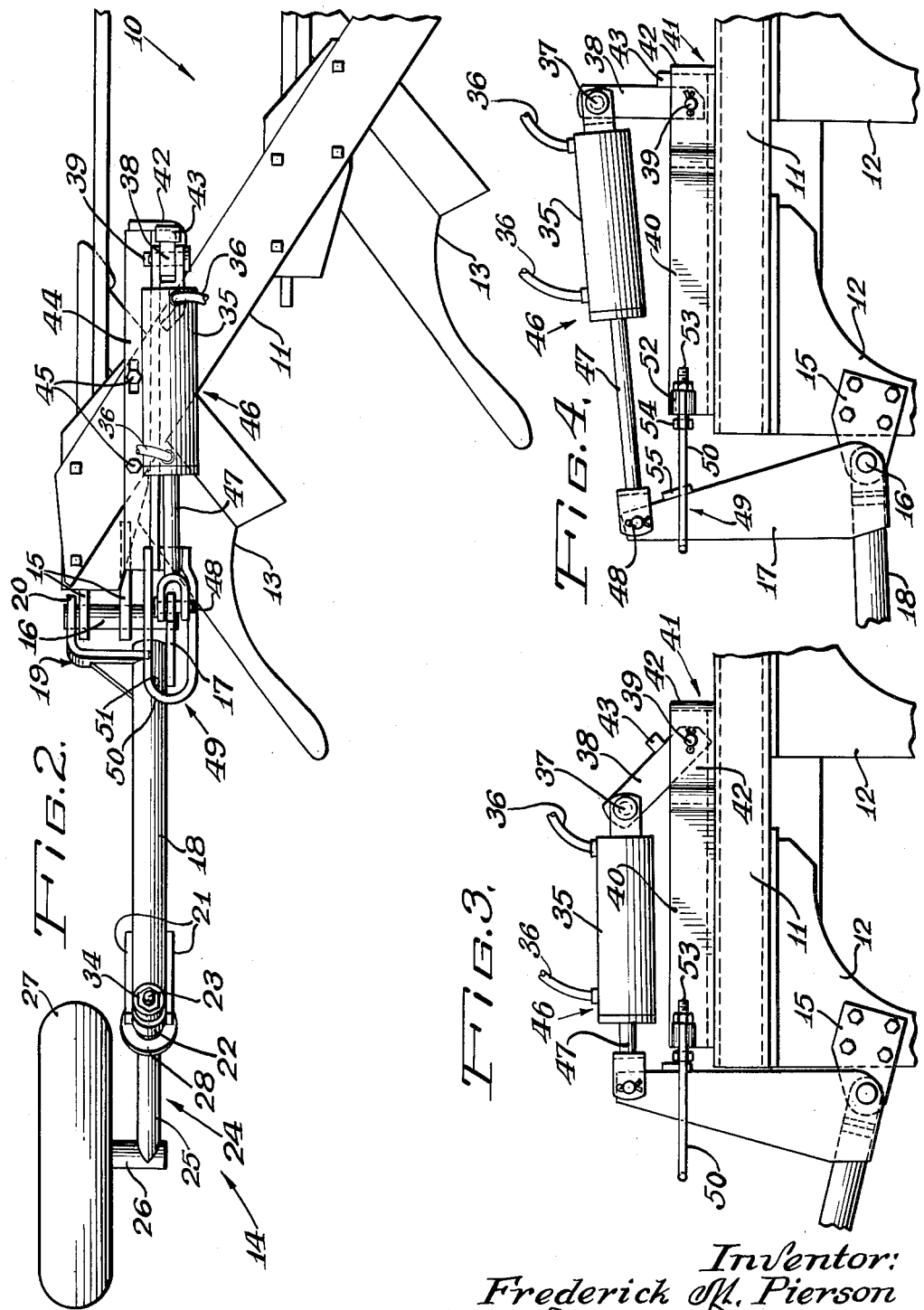

3,065,803
CYLINDER MOUNTING FOR TAIL WHEEL
OF PLOWS
Frederick M. Pierson, Naperville, Ill., assignor to International Harvester Company, Chicago, Ill., a corporation of New Jersey
Filed Oct. 21, 1960, Ser. No. 64,091
6 Claims. (Cl. 172—413)

This invention relates to agricultural implements and particularly to plows. More specifically, the invention concerns the type of plow, the rear end of which is supported in transport on a rear furrow or tail wheel.

An object of the invention is the provision of an improved rear furrow wheel mounting for an implement of the semi-mounted type, the front of which is raised and lowered by vertically moving the tractor hitch by which the implement is connected to the tractor.

Another object of the invention is the provision of novel power transmission means for controlling the operation of a plow wheel or the like.

Another object of the invention is the provision of an improved mounting for a hydraulic cylinder utilized to raise and lower the rear end of a plow by remote control from the vehicle by which the implement is drawn.

Other objects and advantages of the invention will become clear from the following detailed description when read in conjunction with the accompanying drawings, wherein:

FIGURE 1 is a view in side elevation of the rear portion of a moldboard plow having a rear furrow wheel control assembly incorporating the features of this invention;

FIGURE 2 is a plan view of the structure shown in FIGURE 1;

FIGURE 3 is a detail showing one position of the power transmission elements, and FIGURE 4 is a detail showing the power transmission elements in another position.

The numeral 10 designates an implement, in this case a moldboard plow, of the semi-mounted type wherein the forward end of the implement, not shown, is connected to a tractive vehicle, also not shown, and raised and lowered thereby.

The frame of the plow comprises a diagonally extending beam 11 upon which are mounted a plurality of plow standards 12 carrying moldboard plow bottoms 13.

It has already been noted that the plow shown in the drawings is a semi-mounted moldboard plow having its front end supported on a tractor and vertically moved thereby between operating and transport positions. The rear end of the plow is supported by a furrow wheel assembly 14.

The rearmost plow standard 12 has affixed thereto a pair of plates 15 in which is rockably mounted a shaft 16 to one end of which is secured an upright lever arm 17.

A rearwardly extending wheel-carrying arm 18 has its forward end affixed to the lower end of lever 17, and also secured to the forward end of wheel arm 18 is an angle bracket 19, the forwardly bent horizontal portion 20 of which is affixed to the other end of shaft 16.

The rear end of arm 18 is held between a pair of plates 21, secured to a vertically extending bearing 22 adapted to rotatably receive for castering the spindle portion 23 of an axle 24 having a rearwardly bent section 25 carrying at its lower end a stub shaft 26 upon which is mounted a furrow wheel 27.

The lower end of bearing 22 has at its ends a cam member 28 having a tooth 29 receivable in a groove 30 in another cam plate 31 secured to the axle 24. Castering of the wheel 27 is yieldably opposed by a spring 32 having its lower end engaging the upper end of bearing 22, with the upper end of the spring engaging a washer 33 held in place by a nut 34 on the threaded end of the spindle section 23. A force tending to cause wheel 27 to caster causes tooth 29 to ride out of groove 30 against the bias of spring 32.

At this point it should be clear that the rear end of the plow frame is vertically moved between operating and transport positions by rocking lever 17 about the axis of shaft 16 to vertically swing the wheel carrying arm 18. This is accomplished by power transmitting apparatus including a hydraulic cylinder 35 supplied with fluid under pressure through hose lines 36 from a source of fluid pressure of any well known type preferably deriving power from the tractor by which the implement is propelled over the ground. Cylinder 35 is anchored to a pivot pin 37 carried at the upper end of a link 38 pivotally mounted upon a pin 39 carried by the upright flange 40 of an elongated angle bar 41 and by an angle bracket 42 affixed to the end and the sides of angle bar 41.

Link 38 is free to swing rearwardly about the axis of pin 39 but is limited in a forward direction by the provision of a block 43 secured to link 38 engageable with the upper edge of angle bracket 42. The horizontal flange 44 of angle bar 41 is anchored to beam 11 by bolts 45.

The cylinder 35 forms part of a hydraulic ram attachment 46 including a piston rod 47 slidable in the cylinder 35 and pivotally connected by a pin 48 with the upper end of lever arm 17.

Cylinder 35 is a two-way cylinder, both the extension and contracting strokes being powered, extension of the rod 47 in the cylinder rocking lever arm 17 in a counterclockwise direction to swing the wheel arm 18 downwardly and raise the tool carrying beam 11 relative thereto into a transport position.

Such a transport position is indicated in FIGURE 4. In this position link 38 is against the stop represented by engagement of block 43 with bracket 42. With the hydraulic ram extended, the rear end of the plow frame is in raised position. If, while in the transport position, the plow were to be backed up and the wheel 27 encounter an obstruction, due to the capacity of link 38 to pivot rearwardly, wheel 27 could swing under its pivot 16 and forwardly into the rear plow unit and become damaged. This movement is limited by the engagement of lever 17 with the rear end of a restrictor member 49 comprising an oval shaped member 50 in the form of a loop having an elongated opening or slot 51 therein.

To the forward end of member 50 is secured a threaded sleeve 52 which, in turn, is affixed to the rear end of the upright flange 40 and is adapted to receive a threaded bolt 53 having a head 54 functioning as a stop engageable by a pad 55 secured to the forward upper portion of lever arm 17, bolt 54 being adjustable in sleeve 52 to thus adjustably limit the forward swinging of lever 17 and the operating depth of the rear end of the plow gauged by wheel 27.

In the transport position of the implement any tendency of arm 18 and wheel 27 to swing forwardly in a counterclockwise direction about the axis of pivot 16 is limited by engagement of the rear upper edge of lever arm 17 with the rear end of the slotted or looped member 50.

Since hydraulic rams are interchangeable on many implements and piston strokes vary, damage which might result from accidental overretraction of piston rod 47 in cylinder 35 is avoided by the capacity of link 38 to swing rearwardly away from the stop 42 and avoid damage to the parts from the power of the hydraulic ram.

It is believed that the construction and operation of the rear furrow wheel control means of this invention will be clearly understood from the foregoing description. It should likewise be understood that the invention has been described in its preferred embodiment and that modifications may be made in the invention without departing from the spirit thereof or the scope of the appended claims.

What is claimed is:

1. The combination with a plow having a rigid tool supporting frame and a rear furrow wheel assembly including a wheel carrier pivotally mounted on the frame on a transverse axis for vertical swinging of the furrow wheel assembly relative to said frame to raise and lower the latter, of a generally horizontally rockable lever arm affixed to said wheel carrier for vertically swinging the wheel assembly upon rocking said lever arm, a link pivoted on the frame for generally horizontal rocking in the plane of said lever arm when the frame is in both the raised and the lowered positions, a hydraulic ram pivotally connected at one end to said link and at its other end to said lever, a stop on the frame engageable with said link to limit the pivoting thereof in one direction, and another stop on the frame engageable with said lever for limiting the rocking thereof in the other direction.

2. The combination with a plow having a rigid tool supporting frame and a rear furrow wheel assembly including a wheel carrier pivotally mounted on the frame on a transverse axis for vertical swinging of the furrow wheel assembly relative to said frame to raise and lower the latter, of a generally horizontally rockable lever arm affixed to said wheel carrier for vertically swinging the wheel assembly upon rocking said lever arm, a link pivoted on the frame for generally horizontal rocking in the plane of said lever arm when the frame is in both the raised and the lowered positions, a hydraulic ram pivotally connected at one end to said link and at its other end to said lever, a stop on the frame engageable with said link to limit the pivoting thereof in one direction, and another stop on the frame engageable with said lever for limiting the rocking thereof in the other direction, said last mentioned stop comprising a member having an elongated opening adapted to rockably receive said lever arm therein.

3. The combination with a plow having a rigid tool supporting frame and a rear furrow wheel assembly including a wheel carrier pivotally mounted on the frame on a transverse axis for vertical swinging of the furrow wheel assembly relative to said frame to raise and lower the latter, of a generally horizontally rockable lever arm affixed to said wheel carrier for vertically swinging the wheel assembly upon rocking said lever arm, a link pivoted on the frame for generally horizontal rocking in the plane of said lever arm when the frame is in both the raised and the lowered positions, a hydraulic ram pivotally connected at one end to said link and at its other end to said lever, a stop on the frame engageable with said link upon extension of said ram, said link, said ram and said lever arm being freely swingable as a unit with said wheel assembly upon vertical swinging thereof in one direction relative to the plow frame.

4. The combination with a plow having a rigid tool supporting frame and a rear furrow wheel assembly including a wheel carrier pivotally mounted on the frame on a transverse axis for vertical swinging of the furrow wheel assembly relative to said frame to raise and lower the latter, of a generally horizontally rockable lever arm affixed to said wheel carrier for vertically swinging the wheel assembly upon rocking said lever arm, a link pivoted on the frame for generally horizontal rocking in the plane of said lever arm when the frame is in both the raised and the lowered positions, a hydraulic ram pivotally connected at one end to said link and at its other end to said lever, a stop on the frame engageable with said link upon extension of said ram, said link, said ram and said lever arm being freely swingable as a unit with said wheel assembly upon vertical swinging thereof in one direction relative to the plow frame, and means for limiting the swinging of the wheel assembly in said one direction.

5. The combination with a plow having a rigid tool supporting frame and a rear furrow wheel assembly including a wheel carrier pivotally mounted on the frame on a transverse axis for vertical swinging of the furrow wheel assembly relative to said frame to raise and lower the latter, of a generally horizontally rockable lever arm affixed to said wheel carrier for vertically swinging the wheel assembly upon rocking said lever arm, means carried by the plow frame engageable with said lever arm upon rocking thereof in one direction to lower the plow frame, and auxiliary means carried by the plow frame engageable with said lever arm to limit rocking thereof in the other direction, said auxiliary means comprising a restrictor member having means serving as a slot adapted to receive said lever arm for horizontal rocking therein, said means serving as a slot being of such dimensions as to accommodate rocking of the lever arm to a position corresponding to a raised position of the frame while limiting additional rocking of the lever arm in a direction to raise the frame, a link pivoted on the frame for generally horizontal rocking in the plane of said lever arm when said frame is in both the raised and the lowered positions, a hydraulic ram connected at one end to said link and at the other end to said lever arm, and a stop on said frame engageable with said link to limit pivoting thereof in one direction, thereby accommodating extension of the ram to rock said lever arm.

6. The invention set forth in claim 5, wherein said restrictor member is in the form of a generally oval shaped loop, one end of which has a threaded sleeve affixed to the plow frame, and a threaded bolt received in said sleeve constitutes an adjustable stop for said lever arm in the lowered position of the plow frame.

References Cited in the file of this patent

UNITED STATES PATENTS

| | | |
|---|---|---|
| 1,277,542 | Cameron | Sept. 3, 1918 |
| 2,076,666 | Ohlendorf | Apr. 13, 1937 |
| 2,668,062 | Drummond | Feb. 2, 1954 |
| 2,778,290 | Greeson et al. | Jan. 22, 1957 |
| 2,968,356 | Mydels | Jan. 17, 1961 |

FOREIGN PATENTS

| | | |
|---|---|---|
| 665,140 | Great Britain | Jan. 16, 1952 |